US012641206B2

(12) United States Patent
Sakata et al.

(10) Patent No.: US 12,641,206 B2
(45) Date of Patent: May 26, 2026

(54) CALIBRATION METHOD AND PROJECTION-TYPE DISPLAY SYSTEM

(71) Applicant: Panasonic Intellectual Property Management Co., Ltd., Osaka (JP)

(72) Inventors: Kazuaki Sakata, Osaka (JP); Kazune Hagino, Osaka (JP)

(73) Assignee: PANASONIC PROJECTOR & DISPLAY CORPORATION, Osaka (JP)

( * ) Notice: Subject to any disclaimer, the term of this patent is extended or adjusted under 35 U.S.C. 154(b) by 230 days.

(21) Appl. No.: 18/632,997

(22) Filed: Apr. 11, 2024

(65) Prior Publication Data

US 2024/0259539 A1      Aug. 1, 2024

Related U.S. Application Data

(63) Continuation of application No. PCT/JP2022/037363, filed on Oct. 6, 2022.

(30) Foreign Application Priority Data

Oct. 27, 2021      (JP) ................................. 2021-175578

(51) Int. Cl.
      *H04N 9/31*          (2006.01)
      *G06T 7/73*          (2017.01)
(52) U.S. Cl.
      CPC ............. *H04N 9/3194* (2013.01); *G06T 7/74* (2017.01); *H04N 9/3147* (2013.01);
      (Continued)
(58) Field of Classification Search
      None
      See application file for complete search history.

(56) References Cited

U.S. PATENT DOCUMENTS

2013/0135439 A1* 5/2013 Kakuko ................. H04N 13/00
                                                                      348/46
2016/0225158 A1* 8/2016 Tsubota .................... G06T 7/85
                                  (Continued)

FOREIGN PATENT DOCUMENTS

JP          11-261993          9/1999
JP          2010-197541        9/2010
                        (Continued)

OTHER PUBLICATIONS

International Search Report issued Dec. 20, 2022 in International (PCT) Application No. PCT/JP2022/037363.
                          (Continued)

*Primary Examiner* — Samira Monshi
(74) *Attorney, Agent, or Firm* — Wenderoth, Lind & Ponack, L.L.P.

(57)          ABSTRACT

A calibration method includes: acquiring a first image captured by a camera at a first timing, the first image showing an area on which an image is projected by a projection-type display device; detecting a plurality of feature points in the acquired first image; superimposing the plurality of detected feature points on the first image and displaying the superimposed feature points on a monitor; receiving a user's operation of selecting a part of the plurality of detected feature points as a plurality of reference points; acquiring a second image captured by the camera at a second timing after the first timing, the second image showing the area; and detecting a deviation of a relative position between the camera and the area by using the plurality of selected reference points and the acquired second image.

12 Claims, 9 Drawing Sheets

(52) U.S. Cl.
CPC . *H04N 9/3185* (2013.01); *G06T 2207/20104*
*(2013.01); G06T 2207/30244* (2013.01)

(56) References Cited

U.S. PATENT DOCUMENTS

| | | | | |
|---|---|---|---|---|
| 2017/0353661 | A1* | 12/2017 | Kawamura | ............... G06T 5/73 |
| 2018/0359466 | A1 | 12/2018 | Sugiura | |
| 2020/0137379 | A1* | 4/2020 | Tsunashima | ......... H04N 13/363 |
| 2021/0027529 | A1* | 1/2021 | Matsunobu | .......... H04N 13/117 |
| 2024/0259539 | A1* | 8/2024 | Sakata | ................... G03B 21/00 |

FOREIGN PATENT DOCUMENTS

| | | |
|---|---|---|
| JP | 2014-60611 | 4/2014 |
| JP | 2018-207373 | 12/2018 |

OTHER PUBLICATIONS

Japanese Notice of Reasons for Refusal issued Jan. 6, 2026 in
corresponding Japanese Patent Application No. 2023-556258, with
English machine translation.

* cited by examiner

FIG. 2

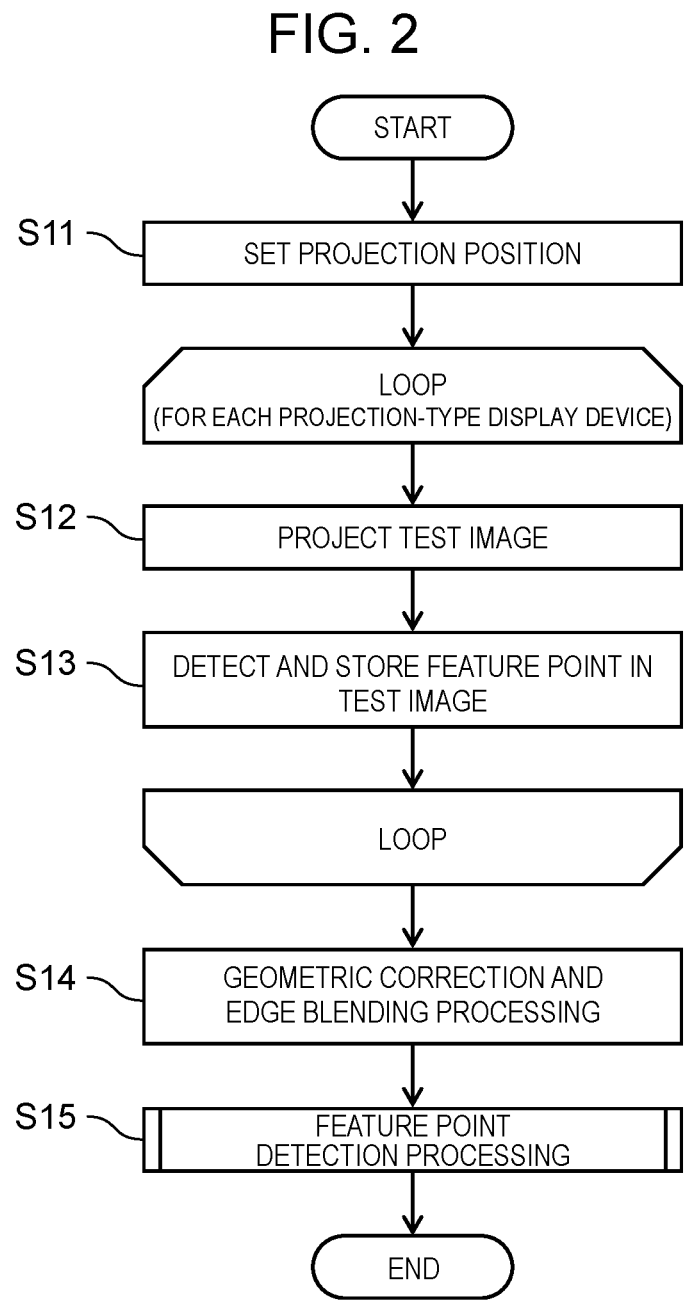

START

S11 — SET PROJECTION POSITION

LOOP
(FOR EACH PROJECTION-TYPE DISPLAY DEVICE)

S12 — PROJECT TEST IMAGE

S13 — DETECT AND STORE FEATURE POINT IN
TEST IMAGE

LOOP

S14 — GEOMETRIC CORRECTION AND
EDGE BLENDING PROCESSING

S15 — FEATURE POINT
DETECTION PROCESSING

END

FIG. 5

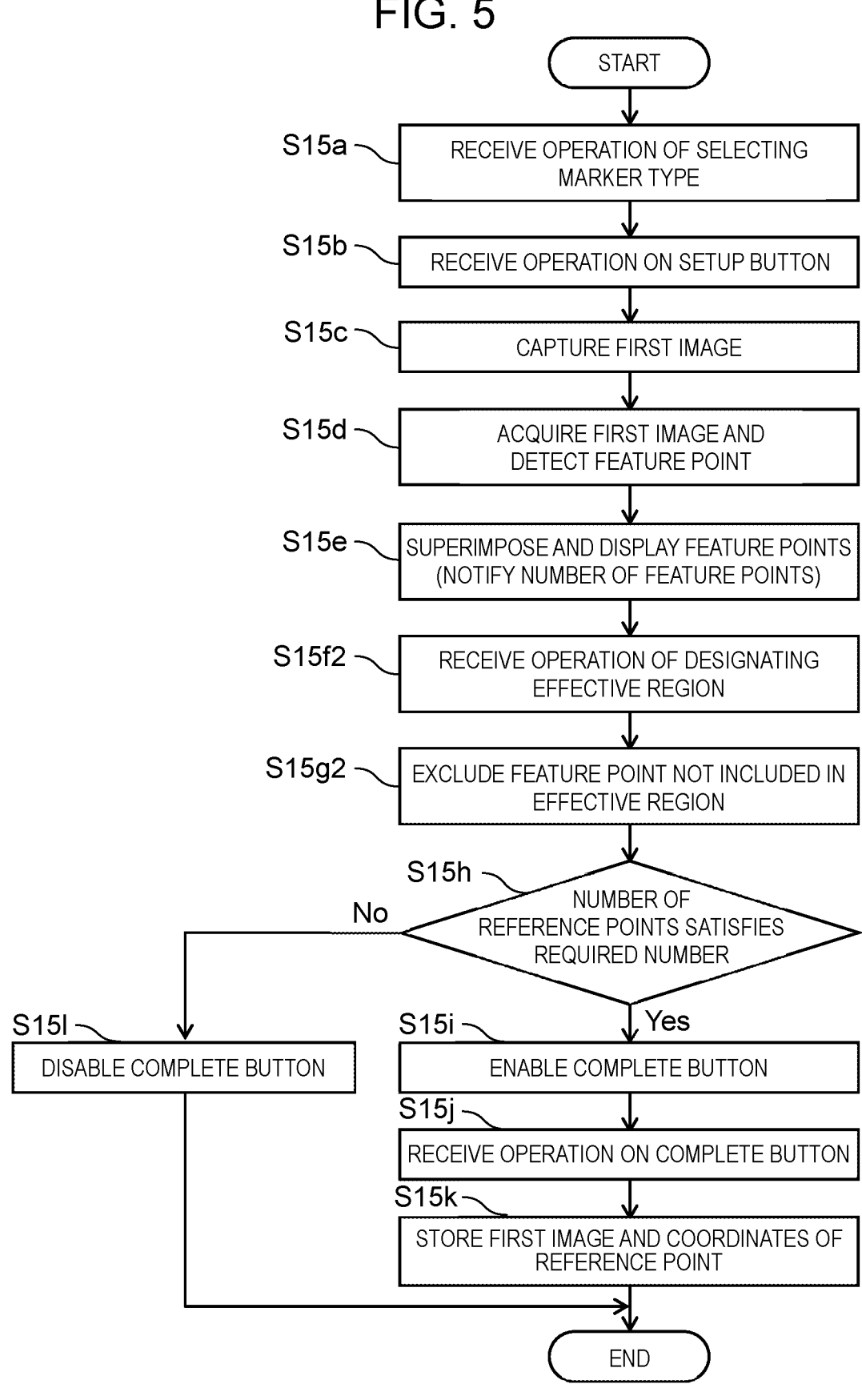

START

S15a — RECEIVE OPERATION OF SELECTING MARKER TYPE

S15b — RECEIVE OPERATION ON SETUP BUTTON

S15c — CAPTURE FIRST IMAGE

S15d — ACQUIRE FIRST IMAGE AND DETECT FEATURE POINT

S15e — SUPERIMPOSE AND DISPLAY FEATURE POINTS (NOTIFY NUMBER OF FEATURE POINTS)

S15f2 — RECEIVE OPERATION OF DESIGNATING EFFECTIVE REGION

S15g2 — EXCLUDE FEATURE POINT NOT INCLUDED IN EFFECTIVE REGION

S15h — NUMBER OF REFERENCE POINTS SATISFIES REQUIRED NUMBER

No

Yes

S15l — DISABLE COMPLETE BUTTON

S15i — ENABLE COMPLETE BUTTON

S15j — RECEIVE OPERATION ON COMPLETE BUTTON

S15k — STORE FIRST IMAGE AND COORDINATES OF REFERENCE POINT

END

CALIBRATION METHOD AND PROJECTION-TYPE DISPLAY SYSTEM

TECHNICAL FIELD

The present disclosure relates to a calibration method for a projection-type display system.

BACKGROUND ART

PTL 1 discloses a technique of detecting a deviation of an imaging device using an image obtained by the imaging device.

CITATION LIST

Patent Literature

PTL 1: Unexamined Japanese Patent Publication No. 11-261993

SUMMARY OF THE INVENTION

The present disclosure provides a calibration method capable of suppressing deterioration in accuracy of calibration regarding projection of an image.

A calibration method according to one aspect of the present disclosure includes: acquiring a first image captured by a camera at a first timing, the first image showing an area on which an image is projected by a projection-type display device; detecting a plurality of feature points in the acquired first image; superimposing the plurality of detected feature points on the first image and displaying the superimposed feature points on a monitor; receiving a user's operation of selecting a part of the plurality of detected feature points as a plurality of reference points; acquiring a second image captured by the camera at a second timing after the first timing, the second image showing the area; and detecting a deviation of a relative position between the camera and the area by using the plurality of selected reference points and the acquired second image.

The calibration method according to one aspect of the present disclosure can suppress deterioration in accuracy of calibration regarding projection of an image.

BRIEF DESCRIPTION OF THE DRAWINGS

FIG. 2 is a flowchart of initial calibration processing.

FIG. 5 is a flowchart of a second example of the feature point detection processing.

DESCRIPTION OF EMBODIMENT

Figure 1:
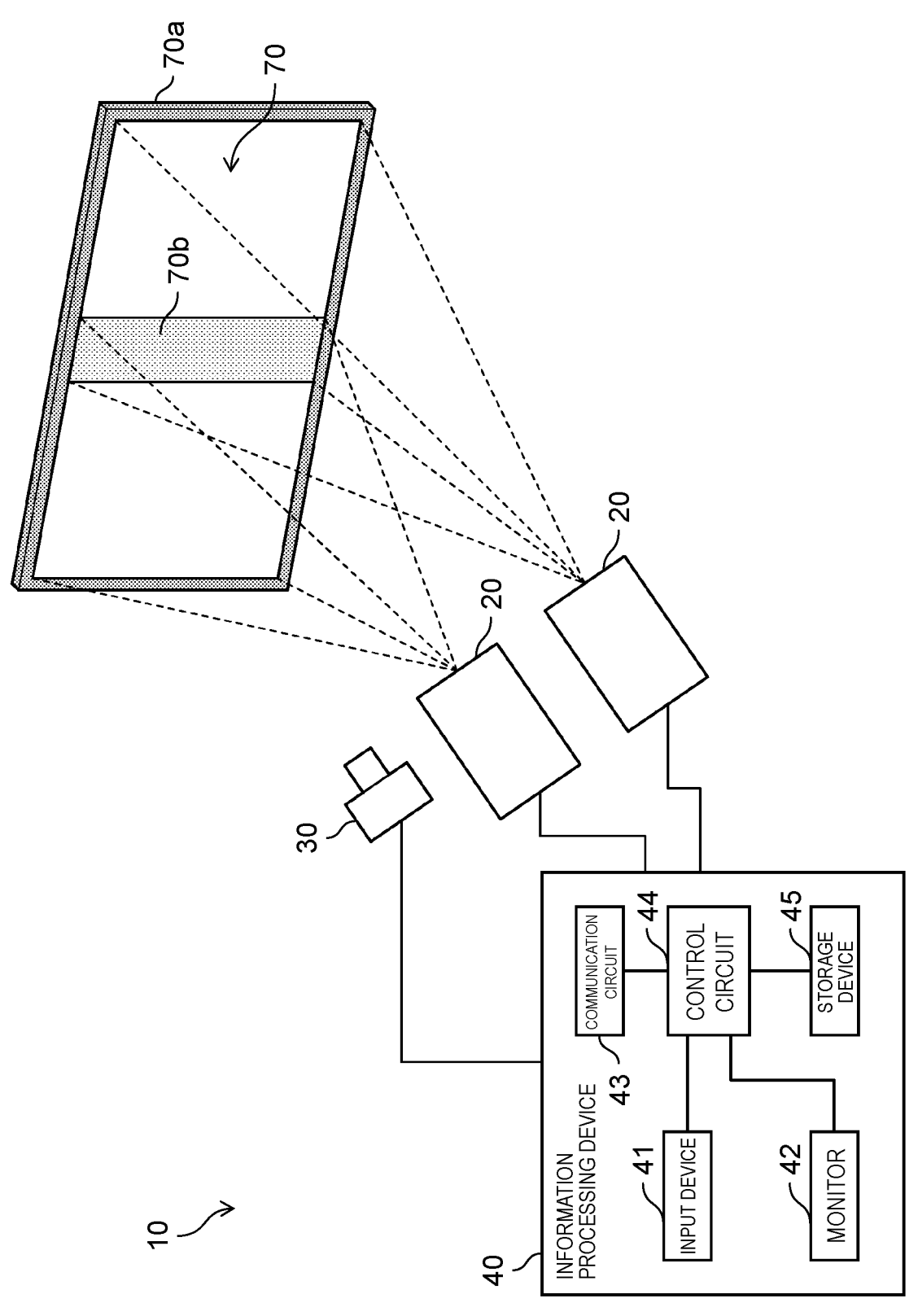
FIG. 1 is a view illustrating a configuration of a projection-type display system according to an exemplary embodiment.

Hereinafter, exemplary embodiments will be described with reference to the drawings. Note that the exemplary embodiments described below illustrate comprehensive or specific examples. Numerical values, shapes, materials, components, arrangement positions and connection modes of the components, steps, order of the steps, and the like shown in the following exemplary embodiments are merely examples, and are not intended to limit the present disclosure. Further, among the components in the following exemplary embodiments, components not recited in the independent claims are described as arbitrary components.

Each drawing is a schematic diagram, and is not necessarily strictly illustrated. In the drawings, substantially the same components are denoted by the same reference numerals, and redundant description may be omitted or simplified.

EXEMPLARY EMBODIMENT

[Configuration]

First, a configuration of a projection-type display system according to an exemplary embodiment will be described. FIG. 1 is a diagram illustrating a configuration of a projection-type display system according to an exemplary embodiment.

Projection-type display system 10 is a system corresponding to multi-projection that constructs one image by images projected by each of two projection-type display devices 20. Further, in order to project an image in accordance with screen 70 (along an area inside frame 70a of screen 70), projection-type display system 10 performs calibration processing using an image captured by camera 30. Projection-type display system 10 includes two projection-type display devices 20, camera 30, and information processing device 40. Note that projection-type display system 10 only needs to include at least one projection-type display device 20, and it is not essential to support multi-projection. Further, projection-type display device 20 may include a plurality of cameras 30.

The projection-type display device 20 projects an image in accordance with screen 70 under the control of information processing device 40. Projection-type display device 20 is realized by, for example, an optical system such as a laser light source, a phosphor wheel, an image display element, and a projection lens. Specifically, the image display element is a digital micromirror device (DMD), a reflective liquid crystal panel (LCOS: Liquid Crystal On Silicon), or the like.

In a case where multi-projection is realized by two projection-type display devices 20, for example, a technique called edge blending is used. Two images projected by two projection-type display devices 20 have an overlapping portion 70b overlapping each other, and in edge blending, the two images are projected so that the brightness of the two images cross-fades in the overlapping portion 70b. As a result, a joint between the two images is suppressed from standing out.

Camera 30 captures an image showing entire screen 70 under the control of information processing device 40. Screen 70 is an example of an area onto which an image is projected by projection-type display device 20. Camera 30 is realized by an image sensor, a lens, and the like.

Information processing device 40 performs information processing for realizing the above-described multi-projection. Such information processing includes calibration processing using an image captured by camera 30 for projecting an image in accordance with screen 70. Information processing device 40 is, for example, a general-purpose device such as a personal computer in which an application program for executing the information processing is installed, but may be a dedicated device of projection-type display system 10. Furthermore, information processing device 40 may be a server including an application program. Specifically, information processing device 40 includes input device 41, monitor 42, communication circuit 43, control circuit 44, and storage devices 45.

Input device 41 receives a user's operation. Input device 41 is, for example, a keyboard and a mouse, but may be a touch panel or the like.

Monitor 42 displays an image. Monitor 42 is realized by, for example, a display panel such as a liquid crystal panel or an organic electro luminescence (EL) panel. Note that monitor 42 may be a device separate from information processing device 40.

Communication circuit 43 is a communication circuit for information processing device 40 to communicate with two projection-type display devices 20 and camera 30. Communication circuit 43 communicates with, for example, two projection-type display devices 20 and camera 30 through a local communication network. The communication performed by communication circuit 43 is, for example, wired communication, but may be wireless communication. A communication standard used for communication is also not particularly limited.

Furthermore, in a case where information processing device 40 is a server, communication circuit 43 may communicate with two projection-type display devices 20 and camera 30 via a wide area network (WAN) or the Internet instead of the local communication network. In this case, the user can control information processing device 40 by accessing information processing device 40, which is a server, from the PC via the network. In this case, input device 41 and monitor 42 do not need to be provided in information processing device 40, and may be provided in a local user PC.

Control circuit 44 performs the above information processing. Specifically, control circuit 44 is implemented by a processor or a microcomputer. The function of control circuit 44 is implemented by a processor or a microcomputer constituting control circuit 44 executing a computer program stored in storage device 45.

Storage device 45 is an example of a non-transitory computer-readable storage medium that stores information necessary for the above information processing, such as a computer program executed by control circuit 44. Specifically, storage device 45 is realized by a semiconductor memory, a hard disk drive (HDD), or the like.

[Initial Calibration Processing]

Next, initial calibration processing of projection-type display system 10 will be described. The initial calibration processing is processing performed at the start of operation of projection-type display system 10 or the like. FIG. 2 is a flowchart of an initial calibration processing of projection-type display system 10.

First, control circuit 44 sets projection positions such that the projection positions of the images of two projection-type display devices 20 are aligned with screen 70 (S11). Here, the projection position is a rectangular region on screen 70 where an image projected by projection-type display device 20 is displayed, and includes coordinates of four vertexes of the rectangular region. In the present exemplary embodiment, the projection position is specified by coordinates including four vertexes of screen 70. In other words, the position of screen 70 is set as the projection position. In step S11, control circuit 44 transmits a control signal to each of two projection-type display devices 20 via communication circuit 43 to cause each of two projection-type display devices 20 to project an image.

At this time, control circuit 44 adjusts a projection direction, a lens shift amount, a zoom magnification, a focal length, and the like of each of two projection-type display devices 20 such that projection ranges of the two images projected by two projection-type display devices 20 include screen 70.

After step S11, control circuit 44 performs processing of storing the projection positions (specifically, coordinates of the feature point in the test image) of the test images of each of two projection-type display devices 20. Hereinafter, processing of storing the projection position of a test image of one projection-type display device 20 will be described, but this processing is performed for each of two projection-type display devices 20.

Control circuit 44 transmits a control signal to projection-type display device 20 via communication circuit 43 to cause projection-type display device 20 to project the test image (S12). The test image may be an image suitable for detecting the feature point in the next step S13, such as an image having a predetermined color pattern.

Next, control circuit 44 detects a feature point in the test image projected on screen 70, and stores coordinates of the detected feature point in storage device 45 (S13). The detection of the feature point in step S13 is processing for specifying the projection position of the image of the projection-type display device 20. In other words, it is processing for specifying the relative position between projection-type display device 20 and screen 70.

Specifically, control circuit 44 transmits a control signal to camera 30 via communication circuit 43 to cause camera 30 to capture an image (still image) including screen 70 on which the test image is projected. Control circuit 44 acquires a captured image (more specifically, image information of the captured image) from camera 30 via communication circuit 43, and detects a plurality of feature points with the acquired image as a processing target. At this time, control circuit 44 uses, for example, an optimized algorithm for detecting a feature point appearing in the test image.

For example, in the test image, a portion where regions of different colors intersect is detected as a feature point. Hereinafter, coordinates of detected N feature points are collectively expressed as $FP(N) = \{FP_1, FP_2, FP_3, \ldots, FP_n, \ldots, FP_N\}$. 1, 2, 3, . . . N are identification information (ID) of the feature point, and $FP_1$, $FP_2$, $FP_3$, . . . are coordinates of respective feature points. The FP(N) is stored in storage device 45.

Next, control circuit 44 performs geometric correction and edge blending processing (S14). If necessary, control circuit 44 performs geometric correction such that an edge of an image projected onto each of two images projected by two projection-type display devices 20 is along frame 70a of screen 70. Control circuit 44 performs edge blending processing on overlapping portion 70b of the two images projected by two projection-type display devices 20. Control circuit 44 automatically executes a series of processing using an image (more specifically, image information obtained from camera 30 through communication circuit 43) captured by camera 30.

Immediately after step S14, control circuit 44 performs feature point detection processing (S15). The feature point detection processing here is processing for specifying a relative position between camera 30 and screen 70. Details of the feature point detection processing will be described later.

[First Example of Feature Point Detection Processing]

Figure 3:
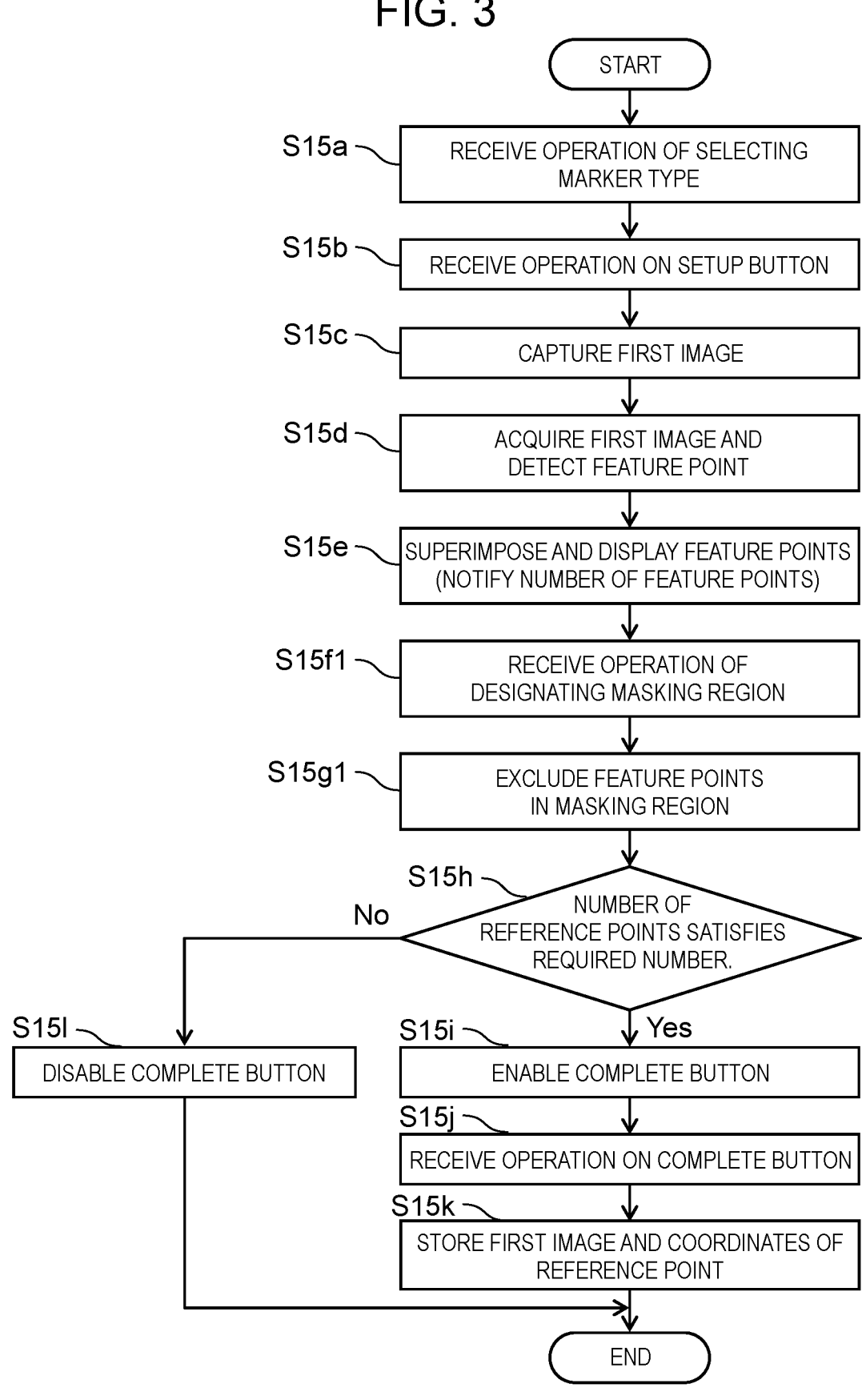
FIG. 3 is a flowchart of a first example of feature point detection processing.
Figure 4:
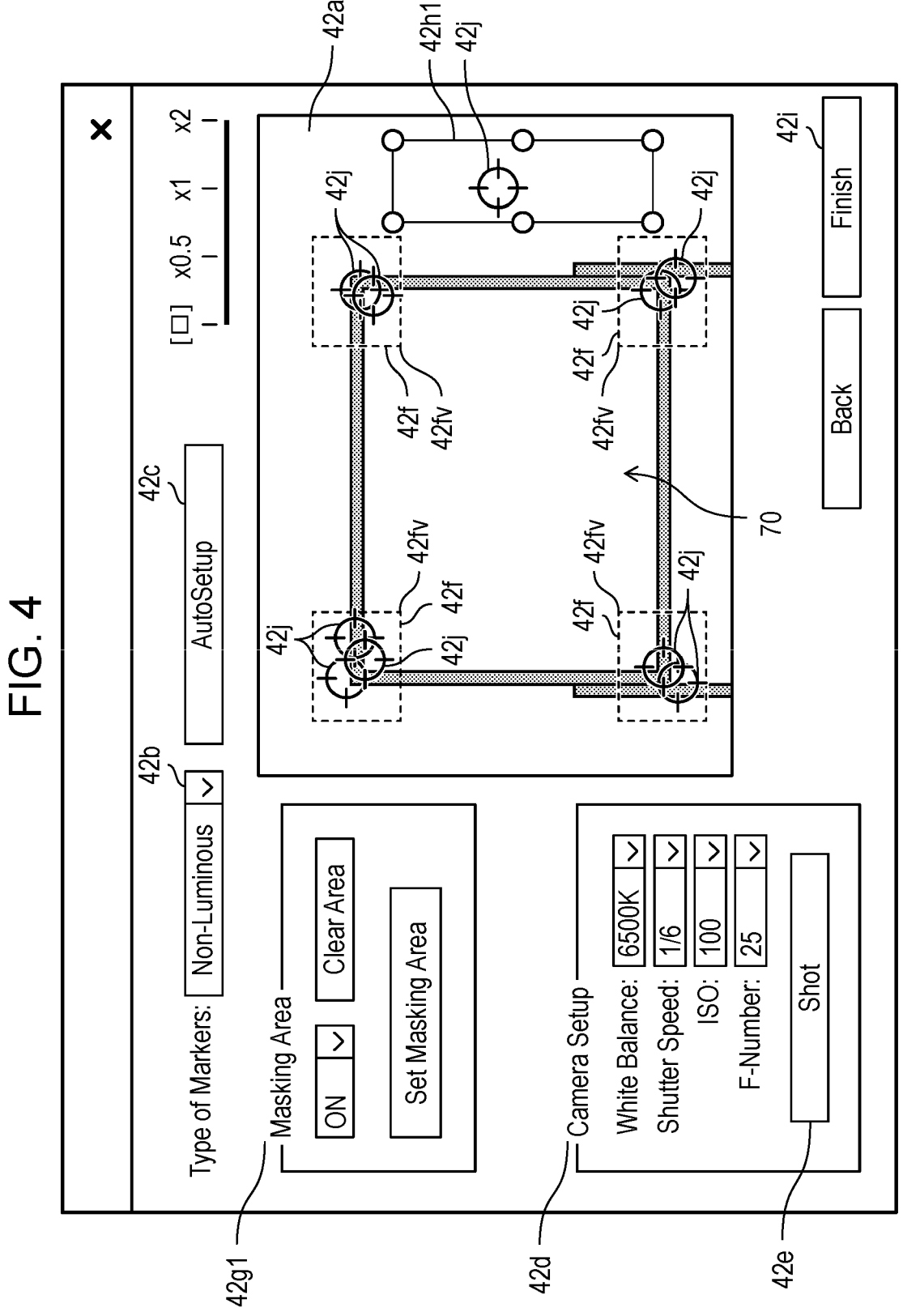
FIG. 4 is a diagram illustrating an example of a graphical user interface used in the first example of the feature point detection processing.

Hereinafter, a specific example of the feature point detection processing performed in step S15 will be described. FIG. 3 is a flowchart of a first example of the feature point detection processing. FIG. 4 is a diagram illustrating an example of a graphical user interface (GUI) displayed on monitor 42 by control circuit 44 in the first example of the feature point detection processing.

Initially, an image currently captured by camera 30 is displayed in real time in main region 42*a* in FIG. 4. In this state, the user performs an operation of selecting a marker type, and input device 41 receives such an operation (S15*a*). Specifically, the user operates pull-down button 42*b* provided in a field of Type of Markers of the GUI in FIG. 4 to select any one of "Non-Luminous", "Luminous", and "Reflective", and input device 41 receives such a selection operation.

As illustrated in FIG. 1, in a case where no marker is provided around the screen and a feature point is detected on screen 70, "Non-Luminous" is selected. Furthermore, as will be described later, "Non-Luminous" is selected when a feature point is detected in a state where a non-luminescent marker is provided around screen 70, and "Luminous" is selected when a feature point is detected in a state where a luminescent marker is provided around screen 70. In addition, in a case where the feature point is detected in a state where the marker that reflects light is provided around screen 70, "Reflective" is selected.

Next, the user operates auto photographing button 42*c*, and input device 41 receives such an operation (S15*b*). Control circuit 44 transmits a control signal to camera 30 via communication circuit 43 in response to the reception of the operation, thereby causing camera 30 to capture an image (still image) (S15*c*). At this time, the photographing conditions (white balance, shutter speed, ISO sensitivity, F-Number, etc.) of the image instructed from information processing device 40 (control circuit 44) to camera 30 by the control signal is automatically set according to the selection result in step S15*a*. Hereinafter, the image captured in step S15*c* is also referred to as a first image.

Note that, instead of the operations in steps S15*a* and S15*b*, the user can manually set the photographing conditions by operating a plurality of pull-down buttons provided in photographing condition setting unit 42*d*, and then, can capture the first image by operating photographing button 42*e* provided in photographing condition setting unit 42*d*.

When the first image is captured by camera 30, control circuit 44 acquires the first image (more specifically, image information of the first image) from camera 30 via communication circuit 43, and detects a plurality of feature points with the acquired first image as a processing target (S15*d*). At this time, control circuit 44 uses, for example, an algorithm for detecting feature points appearing at four corners (vertices of the rectangle) of rectangular screen 70. Control circuit 44 may detect a point having a large contrast difference, that is, a point having a relatively high spatial frequency in the first image acquired by camera 30 as a feature point. Note that any existing algorithm may be used to detect the feature point, and open source or the like may be appropriately used.

Next, control circuit 44 overlaps a plurality of objects 42*j* corresponding to the plurality of detected feature points on the first image and displays the overlapping object on main region 42*a* (monitor 42) (S15*e*). In the present exemplary embodiment, a figure obtained by combining a circle and four lines is used for object 42*j* indicating each feature point, but a figure having an arbitrary shape can be used for the object indicating each feature point. At this time, control circuit 44 detects four corners of screen 70 shown in the first image, and sets specific region 42*f* at each of the four corners of screen 70. Specific region 42*f* is set with the projection position of the image as a base point. Specifically, in each of specific regions 42*f* corresponding to the four corners of screen 70, at least a part of specific region 42*f* is located outside the corresponding vertex of screen 70. In other words, it is sufficient that specific region 42*f* includes the vertex of screen 70 and at least a part of specific region 42*f* is located outside screen 70. Most preferably, in a case where specific region 42*f* is a rectangle, each specific region 42*f* is located so that, with a point at which the two diagonals of screen 70 intersect as a center, among the four vertices in each specific region 42*f*, vertex 42*fv* of specific region 42*f* close to the center is adjacent on the outer side of the adjacent vertex of screen 70.

In addition, control circuit 44 displays the set specific region 42*f* in the first image in a mode distinguishable from other regions. Specifically, control circuit 44 superimposes and displays an object (indicator) indicating specific region 42*f* in the first image. The object indicating specific region 42*f* is, for example, a rectangular frame, and is illustrated by a broken line in FIG. 4. Note that a specific mode (shape, size, color, or the like) of the object indicating specific region 42*f* is not particularly limited.

In order to ensure calibration accuracy, a predetermined number or more (for example, four or more) of feature points need to be detected in each of four specific regions 42*f*. Therefore, control circuit 44 changes the display mode of specific region 42*f* according to whether or not a predetermined number or more of feature points are detected.

For example, control circuit 44 displays, in semitransparent green (first mode), an object (more specifically, the inside of the rectangular frame of the object) indicating specific region 42*f* (first region) in which a predetermined number or more of feature points are detected. Then, control circuit 44 displays, in translucent red (second mode), an object indicating specific region 42*f* (second region) in which a predetermined number or more of feature points are not detected. As a result, control circuit 44 can notify the user whether each of four specific regions 42*f* satisfies the required number of feature points. That is, control circuit 44 can notify the user of the number of feature points in each of four specific regions 42*f*.

It is not essential that the display mode of the object indicating specific region 42*f* is changed on the basis of the color, and the display mode may be changed on the basis of the color, shape, size, line type of frame line, blinking cycle, or the like of the object. In addition, the display mode of the object indicating specific region 42*f* may be changed by combining two or more of the color, shape, size, line type of frame line, blinking cycle, and the like of the object. In specific region 42*f*, the number of feature points included in specific region 42*f* may be displayed as numbers.

By the way, the feature point is used to confirm the deviation of the relative position between camera 30 and screen 70, but may be detected at an unexpected position irrelevant to screen 70. For example, depending on a state of illumination at the time of capturing the first image, a feature point may be detected at a position irrelevant to screen 70. In addition, even when an obstacle (such as a cable or a stepladder) appears in the first image, a feature point may be detected at a position irrelevant to screen 70. As described above, the use of the feature point detected at a position irrelevant to screen 70 for calibration causes deterioration in accuracy of calibration.

Therefore, projection-type display system 10 has a function of excluding unnecessary feature points. Specifically, the user operates masking region designation unit 42g1, and input device 41 receives such an operation (S15f1). As a result, the user can designate masking region 42h1 at a desired position in the first image. Control circuit 44 excludes (invalidates) the feature point included in designated masking region 42h1 among the plurality of feature points detected in step S15d (S15g1). As a result, feature points obtained by excluding one or more feature points belonging to masking region 42h1 from among the plurality of feature points detected in step S15d are selected as final feature points. Hereinafter, the final feature points are also referred to as reference points.

Control circuit 44 changes the display mode of the reference point and the excluded feature point. For example, control circuit 44 does not display the excluded feature point in main region 42a (cancels the display), but may display the excluded feature point in a mode different from that of the reference point. The mode different from that of the reference point means that display is performed in a color different from that of the reference point or in an icon shape different from that of the reference point.

Next, control circuit 44 determines whether each of four specific regions 42f satisfies a required number of reference points (final feature points) (S15h). When determining that each of four specific regions 42f satisfies the required number of reference points (Yes in S15h), control circuit 44 enables complete button 42i (S15i). The user operates complete button 42i, and input device 41 receives such an operation (S15j). Control circuit 44 stores the first image and the coordinates of each of all the reference points in the first image in association with each other in storage device 45 when the operation is received (S15k). Note that identification information (ID) of the reference point is assigned to the coordinates of the reference point.

On the other hand, when determining that at least one of four specific regions 42f does not satisfy the required number of reference points (No in S15h), control circuit 44 disables complete button 42i (S151), and does not receive the user's operation on the complete button. In this case, the user recaptures the first image (step S15c) by changing the photographing condition or the like.

As described above, in the first example of the feature point detection processing, projection-type display system 10 acquires a first image captured by camera 30, the first image showing an area (the area surrounded by frame 70a of screen 70) on which an image is projected by projection-type display device 20, and detects a plurality of feature points in the acquired first image. Further, projection-type display system 10 superimposes the plurality of detected feature points on the first image and displays the superimposed feature points on monitor 42, and receives an operation of designating masking region 42h1 in the first image when the plurality of feature points are displayed superimposed on the first image. As a result, feature points excluding one or more feature points belonging to the designated masking region 42h1 from among the plurality of feature points are selected as a plurality of reference points.

Such a projection-type display system 10 has a function of excluding unnecessary feature points from the reference points, so that it is possible to suppress deterioration in accuracy of calibration processing and failure of calibration processing.

In step S15f1, an operation of designating masking region 42h1 is performed as an operation of selecting only a part of the plurality of feature points as the plurality of reference points. In step S15f1, an operation of directly designating a feature point desired to be excluded by the user with a pointer or the like may be performed. That is, in step S15f1, an operation of directly designating a part of the plurality of feature points may be performed as an operation of selecting a part of the plurality of feature points as the plurality of reference points. In this case, a feature point obtained by excluding one or more designated feature points from the plurality of feature points is selected as the plurality of reference points.

Further, projection-type display system 10 may receive both an operation of designating masking region 42h1 and an operation of directly designating a feature point desired to be excluded with a pointer or the like as an operation of selecting only a part of the plurality of feature points as the plurality of reference points.

[Second Example of Feature Point Detection Processing]

Figure 6:
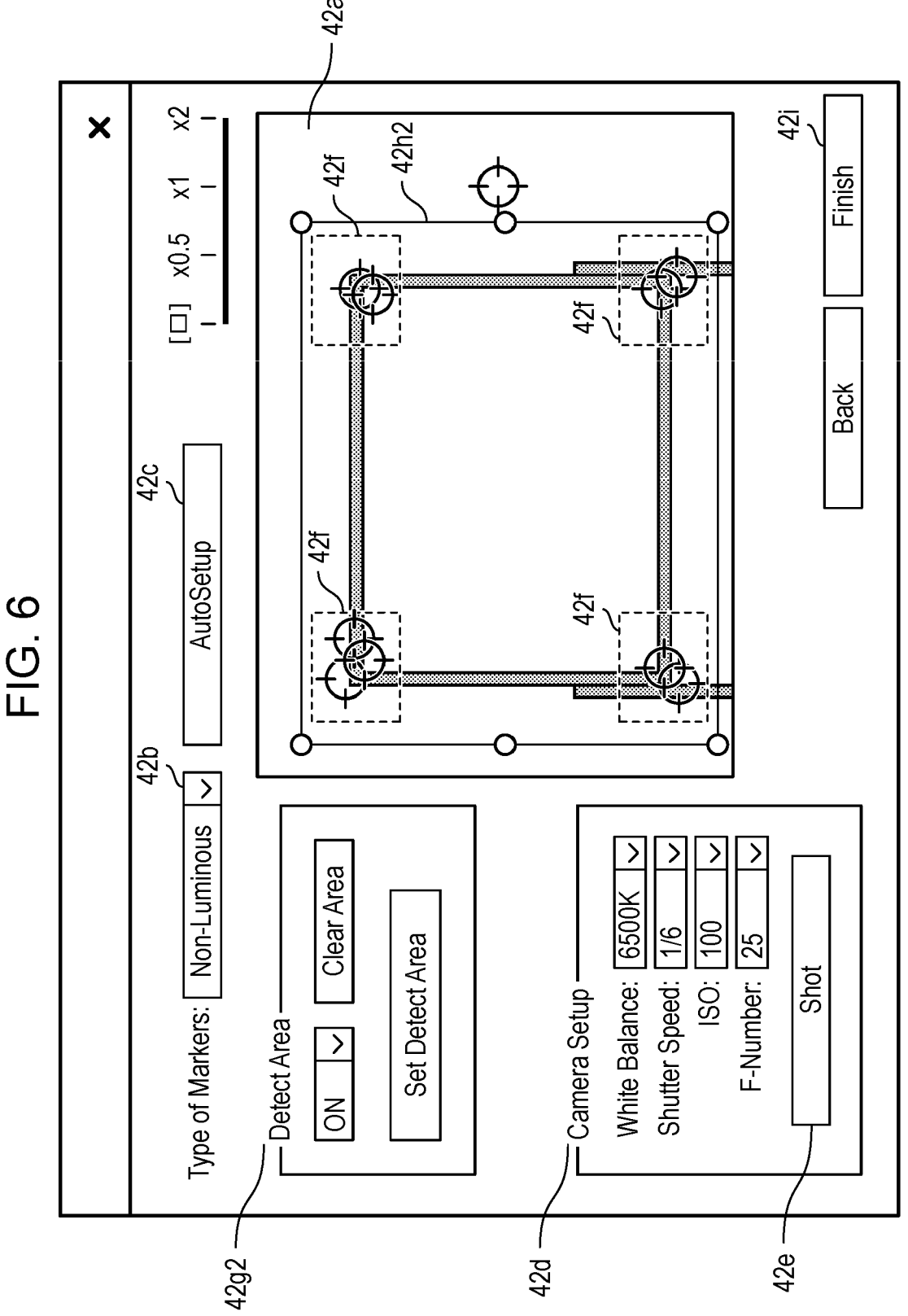
FIG. 6 is a diagram illustrating an example of a graphical user interface used in the second example of the feature point detection processing.

Hereinafter, another specific example of the feature point detection processing performed in step S15 will be described. FIG. 5 is a flowchart of a second example of the feature point detection processing. FIG. 6 is a diagram illustrating an example of a graphical user interface displayed on monitor 42 by control circuit 44 in the second example of the feature point detection processing.

Since the processing of steps S15a to S15e is similar to that of the first example of the feature point detection processing, the description thereof is omitted. After step S15e, the user operates effective region designation unit 42g2, and input device 41 receives such an operation (S15f2). As a result, the user can designate effective region 42h2 at a desired position in the first image. Control circuit 44 excludes (invalidates) feature points not included in designated effective region 42h2 among the plurality of feature points detected in step S15d (S15g2). As a result, only the feature points belonging to effective region 42h2 are selected as the reference points from among the plurality of feature points detected in step S15d.

Next, control circuit 44 determines whether each of four specific regions 42f satisfies the required number of reference points (S15h). Processing in subsequent steps S15i to S151 is similar to that in the first example of the feature point detection processing, and thus description thereof is omitted.

As described above, in the second example of the feature point detection processing, projection-type display system 10 acquires a first image captured by camera 30, the first image showing an area (the area surrounded by frame 70a of screen 70) on which the image is projected by projection-type display device 20, and detects a plurality of feature points in the acquired first image. Further, projection-type display system 10 superimposes the plurality of detected feature points on the first image and displays the superimposed feature points on monitor 42, and receives an operation of designating effective region 42h2 in the first image when the plurality of feature points are displayed superimposed on the first image. As a result, only the feature points belonging to the designated effective region 42h2 from among the plurality of feature points are selected as the plurality of reference points.

As described above, projection-type display system 10 has the function of excluding the unnecessary feature points from the reference points, so that it is possible to suppress degradation in accuracy of the calibration processing and failure of the calibration processing.

In step S15f2, an operation of designating effective region 42h2 is performed as an operation of selecting only a part of the plurality of feature points as the plurality of reference points. In step S15f2, an operation of directly designating the feature point desired to be selected as the reference point by the user with a pointer or the like may be performed. That is, in step S15f2, the operation of directly designating the plurality of feature points may be performed as the operation of selecting a part of the plurality of feature points as the plurality of reference points. In this case, only the designated feature points are selected as the plurality of reference points from among the plurality of feature points.

Further, projection-type display system 10 may receive, as the operation of selecting only a part of the plurality of feature points as the plurality of reference points, both the operation of designating effective region 42h2 and the operation of directly designating the feature points desired to be selected as the reference points with a pointer or the like.

[Calibration Processing]

Figure 7:
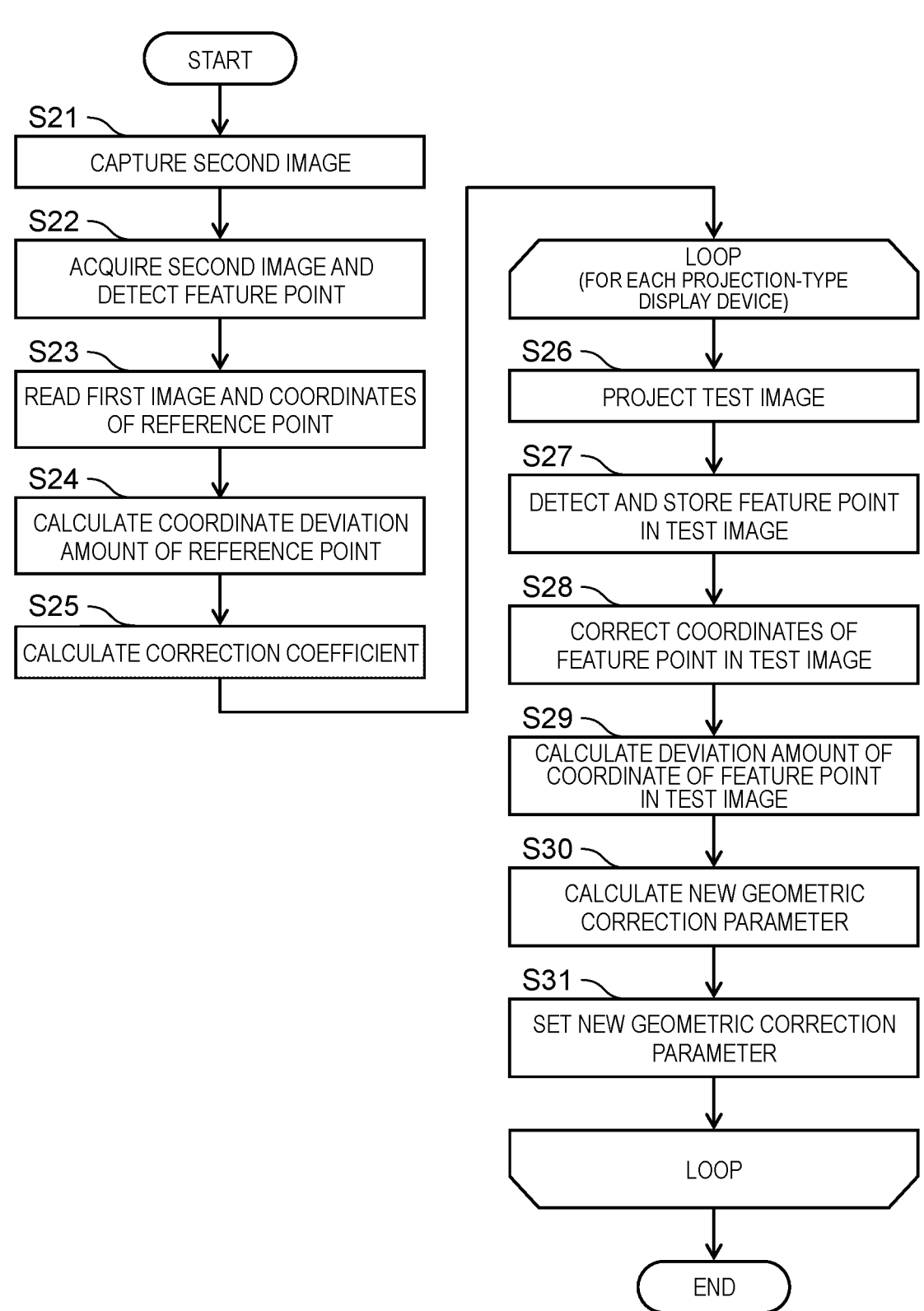
FIG. 7 is a flowchart of calibration processing.

Next, calibration processing performed after the first timing at which the initial calibration processing is performed will be described. FIG. 7 is a flowchart of the calibration processing.

When a predetermined second timing after the first timing arrives, control circuit 44 transmits a control signal to camera 30 via communication circuit 43 in response to the arrival, thereby causing camera 30 to capture an image (still image) (S21). For example, control circuit 44 stores photographing conditions in storage device 45 at the time of the initial calibration processing, and refers to storage device 45 to cause the camera to capture an image under the same photographing conditions as those at the time of the initial calibration processing. Hereinafter, the image captured in step S21 is also referred to as a second image.

Note that the second image is automatically captured without depending on the user's operation. For example, control circuit 44 manages schedule information (once every predetermined period of time, such as one day, one week, or one month) of the calibration processing, and periodically captures the second image on the basis of the schedule information. The schedule information is stored (registered) in advance in storage device 45 by the user's operation on input device 41, for example. Note that the photographing schedule may be managed by a higher-level device than information processing device 40 such as a cloud server (not illustrated), and information processing device 40 may capture the second image on the basis of a command from the higher-level device.

Furthermore, the second image may be captured on the basis of a user's operation. For example, the second image may be captured when the user inputs a photographing command of the second image by performing a predetermined operation on input device 41 when the user views the image projected on screen 70 and determines that calibration is necessary.

When the second image is captured by camera 30, control circuit 44 acquires the second image (more specifically, image information of the second image) from camera 30 via communication circuit 43, and detects a plurality of feature points with the acquired second image as a processing target (S22). The method of detecting the plurality of feature points is similar to the method described in step S15d except that the processing target is the second image.

Next, control circuit 44 reads the first image and the coordinates of the plurality of reference points stored in storage device 45 in step S15k (S23). Then, control circuit 44 calculates the coordinate deviation amount at the current time point (second timing) of each of the plurality of read reference points (S24). Specifically, control circuit 44 specifies the feature amount of each of the plurality of read reference points by collating the coordinates of each of the plurality of reference points with the first image. For each of the plurality of reference points, control circuit 44 determines one feature point having a feature amount most similar to the feature amount of the reference point from among the plurality of feature points detected in step S22. That is, control circuit 44 selects some of the plurality of feature points of the second image as the plurality of reference points of the second image on the basis of the plurality of reference points of the first image. Then, the coordinate of the reference point and the coordinate of the determined feature point are calculated as the coordinate deviation amount.

Note that the coordinate deviation amount of each of the plurality of reference points indicates a deviation (change) of the relative position between camera 30 and screen 70. That is, in step S23, it can be said that the deviation of the relative position between camera 30 and screen 70 is detected. That is, the deviation (change) in the relative position between camera 30 and screen 70 is detected based on the deviation (coordinate deviation amount) between the reference point of the first image and the reference point of the second image.

Next, control circuit 44 calculates a correction coefficient of the coordinate system of camera 30 on the basis of the coordinate deviation amount of each of the plurality of reference points (S25). Control circuit 44 calculates, as a correction coefficient, homography matrix H for converting the coordinate system of camera 30 at the current time point (second timing) into the coordinate system of camera 30 at the time point (first timing) when the initial calibration processing is executed, on the basis of the coordinate deviation amount of each of the plurality of reference points. The homography matrix H is expressed by the following formula.

$$H = \begin{pmatrix} H_{11} & H_{12} & H_{13} \\ H_{21} & H_{22} & H_{23} \\ H_{31} & H_{32} & 1 \end{pmatrix} \qquad \text{[Math 1]}$$

Here, when the coordinates of the second image (image captured at the current time point) are (x, y), the corresponding coordinates (x', y') of the first image (image captured at the time point when the initial calibration processing is executed) are expressed by the following formula.

$$x' = \frac{H_{11}x + H_{12}y + H_{13}}{H_{31}x + H_{32}y + 1} \qquad \text{[Math 2]}$$

$$y' = \frac{H_{21}x + H_{22}y + H_{23}}{H_{31}x + H_{32}y + 1}$$

Note that, since a method of calculating homography matrix H from the deviation amounts of four or more reference points in the biaxial coordinate system is known, a detailed description thereof is omitted here.

Subsequently, control circuit 44 performs correction processing of image projection position for each of two projection-type display devices 20. Hereinafter, processing of correcting the image projection position of one projection-type display device 20 will be described, but this processing is performed for each of the two projection-type display devices 20.

First, control circuit 44 transmits a control signal to projection-type display device 20 via communication circuit 43 to cause projection-type display device 20 to project the test image (S26). The test image is the same as the test image projected in step S12 of the initial calibration processing.

Next, control circuit 44 detects a feature point in the test image projected on screen 70, and stores coordinates FP'(N) of the detected feature point in storage device 45 (S27). This processing is similar to step S13 of the initial calibration processing.

Next, control circuit 44 corrects the coordinates FP'(N) of the feature point detected in step S27 on the basis of the correction coefficient (homography matrix H) calculated in step S25 (S28). That is, control circuit 44 corrects the coordinates of the feature point detected in the positional relationship between camera 30 and screen 70 at the current time point to the coordinates obtained when the feature point is detected in the positional relationship between camera 30 and screen 70 when the initial calibration processing is executed. Specifically, control circuit 44 calculates the corrected coordinates FP"(N) by the following formula.

$$FP''(N) = H \times FP'(N) \qquad \text{[Math 3]}$$

Next, control circuit 44 calculates a deviation amount between coordinates FP(N) of the feature point stored in step S13 of the initial calibration processing and coordinates FP"(N) of the feature point obtained in step S28 (S29). In coordinates FP"(N) after the correction, the deviation (change) of the relative position between camera 30 and screen 70 included in coordinates FP'(N) before the correction is removed. Therefore, the deviation amount between the coordinates FP(N) and the coordinates FP"(N) indicates the deviation (change) of the relative position between projection-type display device 20 and screen 70. That is, in step S29, it can be said that the deviation of the relative position between projection-type display device 20 and screen 70 is detected.

Next, control circuit 44 calculates a new geometric correction parameter on the basis of the coordinate deviation amount calculated in step S29 (S30). Specifically, for each feature point n, control circuit 44 calculates homography matrix $H_n$ such that the coordinates $FP''_n$ move to the coordinates $FP_n$, and calculates a new geometric correction parameter (homography matrix) $Hnew_n$ by multiplying the current geometric correction parameter (homography matrix) $Hold_n$ by homography matrix $H_n$. That is, the new geometric correction parameter $Hnew_n$ is calculated based on the expression of $Hnew_n = Hold_n \times H_n$.

Then, control circuit 44 sets the new geometric correction parameter calculated in step S30 in projection-type display device 20 (S31). Specifically, control circuit 44 transmits a setting command including the new geometric correction parameter to projection-type display device 20 via communication circuit 43. As a result, the geometric correction parameter in projection-type display device 20 is changed. In other words, the image projected by projection-type display device 20 is corrected.

When determining that the deviation amount calculated in step S29 is smaller than the predetermined value, control circuit 44 may omit the processing of steps S30 and S31. For example, when the coordinates FP"(N) and the coordinates FP(N) substantially coincide with each other and there is no deviation in the relative position between projection-type display device 20 and screen 70, there is no need to correct the image projected by projection-type display device 20.

As described above, in the calibration processing, projection-type display system 10 acquires a second image captured by camera 30, the second image showing an area surrounded by frame 70a of screen 70, and detects the deviation in the relative position between camera 30 and the area using the plurality of reference points selected in the initial calibration processing and the acquired second image. Further, projection-type display system 10 corrects the image projected by projection-type display device 20 on the basis of the detected deviation in the relative position.

As described above, if the calibration processing is periodically performed without user's operation as a requirement, it is possible to suppress the occurrence of the deviation of the projection positions of the images by two projection-type display devices 20 without manual operation. Further, as described above, since the feature points unnecessary in the initial calibration processing are excluded from the reference points, projection-type display system 10 can suppress deterioration in accuracy of the calibration processing. Since unnecessary feature points are excluded from the reference points, the possibility of failing in the calibration processing is reduced, so that automation of the calibration processing is facilitated. In addition, even in a case where the calibration processing is not automated, there is an advantage that a user who is not accustomed to the operation can instruct the calibration processing with a small number of operations.

[First Modification]

Figure 8:
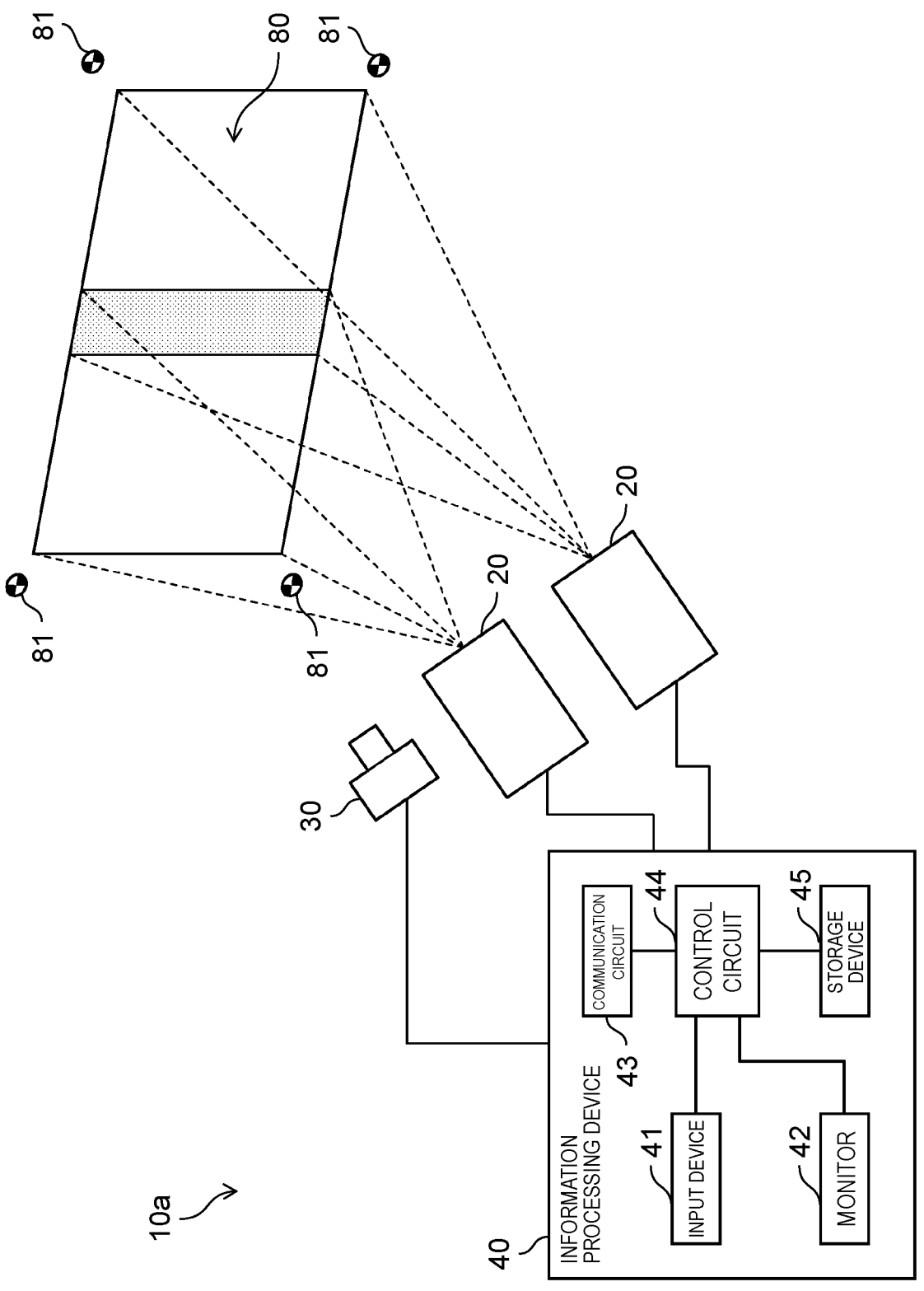
FIG. 8 is a view illustrating a configuration of a projection-type display system according to a first modification.

Next, a configuration of a projection-type display system according to a first modification will be described. FIG. 8 is a diagram illustrating a configuration of the projection-type display system according to the first modification.

Projection-type display system 10a is different from projection-type display system 10 in that an image is projected onto wall surface 80 instead of screen 70, and the other configurations are the same as those of projection-type display system 10, so that the description thereof is omitted.

Wall surface 80 is used as an area onto which an image is projected by projection-type display device 20. Four non-luminescent markers 81 are provided on wall surface 80. The number and arrangement of non-luminescent markers 81 are not particularly limited.

In the feature point detection processing executed by projection-type display system 10a, feature points appearing in a plurality of non-luminescent markers 81 (or the periphery thereof) shown in the first image are detected, and control circuit 44 uses an algorithm suitable for detecting such feature points. The processing of detecting a feature point in the second image is also similar to the feature point detection processing (the processing of detecting a feature point in the first image).

Similarly to projection-type display system 10, projection-type display system 10a has a function of excluding unnecessary feature points from the reference points in the initial calibration processing (feature point detection processing). Therefore, projection-type display system 10a can suppress deterioration in accuracy of the calibration processing.

[Second Modification]

Figure 9:
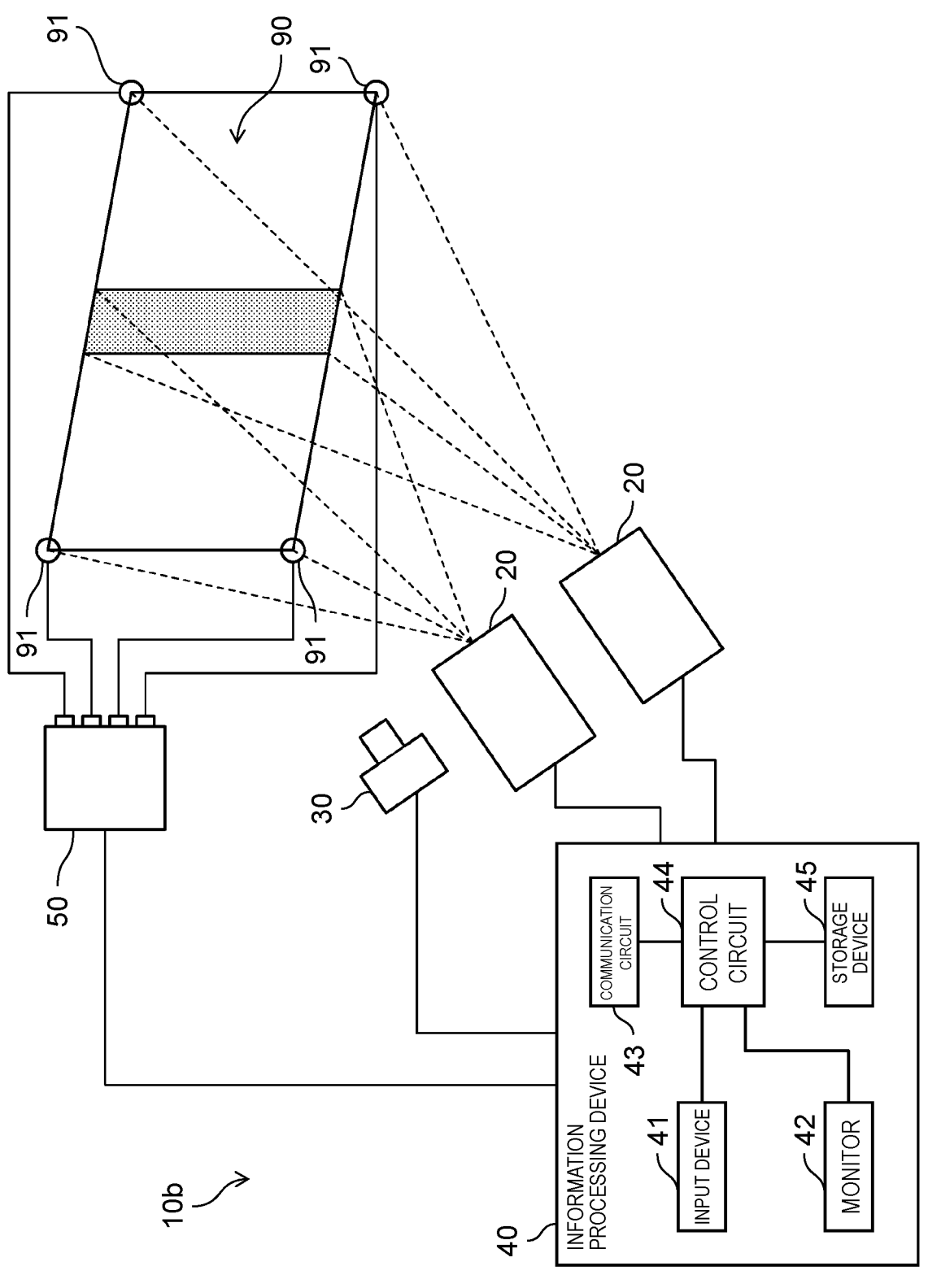
FIG. 9 is a view illustrating a configuration of a projection-type display system according to a second modification.

Next, a configuration of a projection-type display system according to a second modification will be described. FIG. 9 is a diagram illustrating a configuration of a projection-type display system according to a second modification.

Projection-type display system 10b projects an image onto screen 90. Unlike screen 70, screen 90 is not provided with frame 70a, and instead of frame 70a, luminescent markers 91 are provided at respective positions corresponding to four vertexes (corners) of screen 90.

Unlike projection-type display system 10, projection-type display system 10b includes marker controller 50. Other configurations of projection-type display system 10b are similar to those of projection-type display system 10, and thus description thereof is omitted.

Marker controller 50 turns on and off luminescent marker 91 under the control of information processing device 40. Luminescent marker 91 is realized by, for example, a light emitting diode (LED) element. The number and arrangement of luminescent markers 91 are not particularly limited.

In the feature point detection processing executed by projection-type display system 10b, the first image is captured in a state where a plurality of luminescent markers 91 are turned on by marker controller 50, and a feature point appearing in the plurality of luminescent markers 91 (or the periphery thereof) shown in the first image is detected. Control circuit 44 uses an algorithm suitable for detecting such a feature point. In the selection of the marker type in step S15a, "Luminous" is selected. The processing of detecting a feature point in the second image is also similar to the feature point detection processing (the processing of detecting a feature point in the first image).

Similarly to projection-type display system 10, projection-type display system 10b also has a function of excluding unnecessary feature points in the initial calibration processing (feature point detection processing) from the reference points. Therefore, projection-type display system 10b can suppress deterioration in accuracy of the calibration processing.

[Third Modification]

Next, a configuration of a projection-type display system according to a third modification will be described. The projection-type display system according to a third modification is different in that a reflective marker is used instead of non-luminescent marker 81 according to the first modification. In the feature point detection processing executed by the projection-type display system according to the third modification, the projection-type display device projects an all-white image, and detects light reflected by the reflective marker. Here, the all-white image is an image in which the pixel value is 255 in the case of a grayscale image and is an image in which the pixel value of any color is 255 in the case of an RGB image. This makes it possible to detect the feature point with a simple configuration even in a dark environment where the projection screen is disposed.

Effects and the Like

As described above, a calibration method executed by a computer such as projection-type display system 10 (information processing device 40) includes: acquiring a first image captured by camera 30 at a first timing, the first image showing an arca on which an image is projected by a projection-type display device 20; detecting a plurality of feature points in the acquired first image; superimposing the plurality of detected feature points on the first image and displaying the superimposed feature points on a monitor 42; receiving a user's operation of selecting a part of the plurality of detected feature points as a plurality of reference points; acquiring a second image captured by the camera 30 at a second timing after the first timing, the second image showing the area; and detecting a deviation of a relative position between the camera 30 and the area by using the plurality of selected reference points and the acquired second image.

Such a calibration method can exclude unnecessary feature points from the reference points, and thus can suppress deterioration in accuracy of calibration (the above-described calibration processing) related to image projection.

Further, for example, the above operation is an operation of designating a region in the first image when a plurality of feature points are displayed superimposed on the first image, and feature points obtained by excluding one or more feature points belonging to the designated region from the plurality of feature points are selected as a plurality of reference points. Such a region is, for example, masking region 42h1 of the above-described exemplary embodiment.

According to such a calibration method, the user can exclude unnecessary feature points from the reference points by designating masking region 42h1.

Furthermore, for example, the above operation is an operation of designating a region in the first image when a plurality of feature points are displayed superimposed on the first image, and feature points belonging to the designated region among the plurality of feature points are selected as a plurality of reference points. Such a region is, for example, effective region 42h2 of the above-described exemplary embodiment.

According to such a calibration method, the user can exclude unnecessary feature points from the reference points by designating effective region 42h2.

In addition, for example, the above operation is an operation of designating one or more of the plurality of feature points when the plurality of feature points are displayed superimposed on the first image, and feature points obtained by excluding the designated one or more feature points from the plurality of feature points are selected as the plurality of reference points.

According to such a calibration method, the user can exclude unnecessary feature points from the reference points by directly designating the unnecessary feature points.

Further, for example, the above operation is an operation of designating a part of the plurality of feature points when the plurality of feature points are displayed superimposed on the first image, and the designated feature points among the plurality of feature points are selected as the plurality of reference points.

According to such a calibration method, the user can exclude unnecessary feature points from the reference points by directly designating the unnecessary feature points.

Furthermore, for example, the calibration method further displays specific region 42f in the first image in which the feature point needs to be detected on monitor 42.

According to such a calibration method, the user can grasp specific region 42f in which the feature point needs to be detected.

Furthermore, for example, the calibration method further notifies the user of the number of feature points detected in specific region 42f.

According to such a calibration method, the user can grasp the number of feature points in specific region 42f.

Furthermore, for example, the number of feature points detected in specific region 42f is notified to the user by the display mode of the object indicating specific region 42f.

According to such a calibration method, the user can grasp the number of feature points in specific region 42f.

Furthermore, for example, the calibration method further corrects the image projected by projection-type display device 20 on the basis of the detected deviation of the relative position.

According to such a calibration method, projection-type display device 20 can project the image along the area in consideration of the detected deviation of the relative position.

Further, projection-type display system 10 includes projection-type display device 20, camera 30, and information processing device 40. Information processing device 40 acquires a first image captured by camera 30 at a first timing, the first image showing an area on which an image is projected by projection-type display device 20; detects a plurality of feature points in the acquired first image; superimposes the plurality of detected feature points on the first image and displays the superimposed feature points on monitor 42; receives a user's operation of selecting a part of the plurality of detected feature points as a plurality of reference points; acquires a second image captured by camera 30 at a second timing after the first timing, the second image showing the area; and detects a deviation of a relative position between camera 30 and the area by using the plurality of selected reference points and the acquired second image.

Such projection-type display system 10 can exclude unnecessary feature points from the reference points, and thus can suppress deterioration in accuracy of calibration (the above-described calibration processing) related to image projection.

Other Exemplary Embodiments

Although the calibration method and the projection-type display system according to the exemplary embodiment have been described above, the present disclosure is not limited to the exemplary embodiment.

For example, the frame of the screen, the marker, or the like is used in the detection of the feature point in the above exemplary embodiment, but other objects may be used for the detection of the feature point. The object is not particularly limited as long as the relative position between the camera and the surface onto which the image is projected can be specified.

For example, in the above exemplary embodiment, the projection-type display system is realized by a plurality of devices. Alternatively, the projection-type display system may be realized as a single device. For example, the projection-type display system may be realized as a single device corresponding to an information processing device. When the projection-type display system is realized by a plurality of devices, each component included in the projection-type display system may be distributed to the plurality of devices in any manner.

In addition, in the above exemplary embodiment, processing executed by a specific processing unit may be executed by another processing unit. Furthermore, the order of a plurality of processing may be changed, or a plurality of processing may be executed in parallel.

In the above exemplary embodiments, each component may be implemented by executing a software program suitable for each component. Each component may be implemented by a program execution unit such as a CPU or a processor reading and executing a software program recorded in a recording medium such as a hard disk or a semiconductor memory.

In addition, each component may be implemented by hardware. For example, each component may be a circuit (or an integrated circuit). These circuits may constitute one circuit as a whole or may be separate circuits. Each of these circuits may be a general-purpose circuit or a dedicated circuit.

In addition, general or specific aspects of the present disclosure may be implemented by a system, an apparatus, a method, an integrated circuit, a computer program, or a computer-readable recording medium such as a CD-ROM. In addition, the present invention may be implemented by an arbitrary combination of a system, an apparatus, a method, an integrated circuit, a computer program, and a recording medium. For example, the present disclosure may be implemented as the projection-type display system or information processing device 40 of the above exemplary embodiments. The present disclosure may be implemented as a program (computer program product) for causing a computer to execute the calibration method of the above exemplary embodiments, or may be implemented as a non-transitory computer-readable storage medium storing such a program.

In addition, the present disclosure also includes a mode obtained by applying various modifications conceived by those skilled in the art to each exemplary embodiment, or a mode realized by arbitrarily combining components and functions in each exemplary embodiment within a range not departing from the gist of the present disclosure.

INDUSTRIAL APPLICABILITY

The calibration method of the present disclosure can suppress deterioration in accuracy of calibration of the projection-type display system.

REFERENCE MARKS IN THE DRAWINGS

10, 10*a*, 10*b* projection-type display system
20 projection-type display device
30 camera
40 information processing device
41 input device
42 monitor
42*a* main region
42*b* pull-down button
42*c* auto photographing button
42*d* photographing condition setting unit
42*e* photographing button
42*f* specific region
42*fv* vertex
42*g*1 masking region designation unit
42*g*2 effective region designation unit
42*h*1 masking region
42*h*2 effective region
42*i* complete button
43 communication circuit
44 control circuit
45 storage device
50 marker controller
70, 90 screen
70*a* frame
70*b* overlapping portion
80 wall surface
81 non-luminescent marker
91 luminescent marker

The invention claimed is:

1. A calibration method, comprising:
acquiring a first image captured by a camera at a first timing, the first image showing an area on which an image is projected by a projection-type display device;
detecting a plurality of feature points in the acquired first image;
superimposing the plurality of detected feature points on the first image and displaying the superimposed feature points on a monitor;
receiving a user's operation of selecting a part of the plurality of detected feature points as a plurality of reference points;
acquiring a second image captured by the camera at a second timing after the first timing, the second image showing the area; and
detecting a deviation of a relative position between the camera and the area by using the plurality of selected reference points and the acquired second image.

2. The calibration method according to claim 1, wherein the operation is an operation of designating a region in the first image when the plurality of feature points are displayed superimposed on the first image, and
feature points excluding one or more feature points belonging to a designated region from among the plurality of feature points are selected as the plurality of reference points.

3. The calibration method according to claim 1, wherein the operation is an operation of designating a region in the first image when the plurality of feature points are displayed superimposed on the first image, and
feature points belonging to a designated region among the plurality of feature points are selected as the plurality of reference points.

4. The calibration method according to claim 1, wherein the operation is an operation of designating one or more of the plurality of feature points when the plurality of feature points are displayed superimposed on the first image, and
feature points excluding one or more designated feature points from among the plurality of feature points are selected as the plurality of reference points.

5. The calibration method according to claim 1, wherein the operation is an operation of designating a part of the plurality of feature points when the plurality of feature points are displayed superimposed on the first image, and
a designated part of the plurality of feature points are selected as the plurality of reference points.

6. The calibration method according to claim 1, further comprising:
displaying, on the monitor in a first aspect, a first region in the first image in which a predetermined number or more of feature points are detected; and displaying, on the monitor in a second aspect different from the first aspect, a second region in the first image in which less than the predetermined number of feature points are detected.

7. The calibration method according to claim 6, further comprising notifying the user of a number of feature points detected in the second region.

8. The calibration method according to claim 7, wherein the number of the feature points detected in the second region is notified to the user according to a display mode of an object indicating the second region.

9. The calibration method according to claim 1, further comprising correcting the image projected by the projection-type display device on a basis of the detected deviation of the relative position.

10. The calibration method according to claim 1, further comprising:
detecting a plurality of feature points in the second image;
selecting a part of the plurality of feature points of the second image as a plurality of reference points of the second image on a basis of the plurality of reference points of the first image; and
detecting the deviation of the relative position on a basis of a deviation between the plurality of reference points of the first image and the plurality of reference points of the second image.

11. A non-transitory computer-readable storage medium storing a program for causing a computer to execute the calibration method according to claim 1.

12. A projection-type display system, comprising:
a projection-type display device;
a camera; and
an information processing device,
wherein the information processing device
acquires a first image captured by a camera at a first timing, the first image showing an area on which an image is projected by a projection-type display device,
detects a plurality of feature points in the acquired first image,
superimposes the plurality of detected feature points on the first image and displays the superimposed feature points on a monitor,
receives a user's operation of selecting a part of the plurality of detected feature points as a plurality of reference points,
acquires a second image captured by the camera at a second timing after the first timing, the second image showing the area, and
detects a deviation of a relative position between the camera and the area by using the plurality of selected reference points and the acquired second image.

* * * * *